United States Patent
Van Der Ende

(10) Patent No.: US 12,098,033 B2
(45) Date of Patent: Sep. 24, 2024

(54) MODULAR CONVEYOR CHAIN

(71) Applicant: REXNORD FLATTOP EUROPE B.V., S-Gravenzande (NL)

(72) Inventor: Remco Van Der Ende, De Lier (NL)

(73) Assignee: Rexnord FlatTop Europe B.V., 's-Gravenzande (NL)

( * ) Notice: Subject to any disclaimer, the term of this patent is extended or adjusted under 35 U.S.C. 154(b) by 77 days.

(21) Appl. No.: 18/010,168

(22) PCT Filed: Jun. 18, 2021

(86) PCT No.: PCT/NL2021/050382
§ 371 (c)(1),
(2) Date: Dec. 13, 2022

(87) PCT Pub. No.: WO2021/256929
PCT Pub. Date: Dec. 23, 2021

(65) Prior Publication Data
US 2023/0242347 A1 Aug. 3, 2023

(30) Foreign Application Priority Data

Jun. 19, 2020 (NL) .......................... 2025872

(51) Int. Cl.
*B65G 17/08* (2006.01)
*B65G 17/40* (2006.01)
*F16G 3/02* (2006.01)

(52) U.S. Cl.
CPC .......... *B65G 17/08* (2013.01); *B65G 17/40* (2013.01); *F16G 3/02* (2013.01)

(58) Field of Classification Search
CPC ........ B65G 17/08; B65G 17/40; B65G 17/38; F16G 3/02

(Continued)

(56) References Cited

U.S. PATENT DOCUMENTS

| 2,962,782 A | 12/1960 | Beach |
| 4,023,239 A | 5/1977 | Stolz |

(Continued)

FOREIGN PATENT DOCUMENTS

| DE | 202019100332 U1 | 5/2019 | |
| NL | 2020301 B1 | 7/2019 | |
| WO | WO-2011051411 A1 * | 5/2011 | ............. B65G 17/08 |

OTHER PUBLICATIONS

PCT International Search Report and Written Opinion, PCT/NL2021/050382, Sep. 30, 2021, 13 pages.

*Primary Examiner* — James R Bidwell
(74) *Attorney, Agent, or Firm* — Quarles & Brady LLP

(57) ABSTRACT

Modular conveyor chain, comprising a number of successive, mutually hingedly connected modules. The modules each comprise a link portion made of sheet metal that has a body part that forms a conveying surface. The body part is provided with a centrally located coupling piece on one side thereof, and a pair of interspaced coupling pieces on an opposite side thereof that include an interspace in between. The coupling pieces of successive modules cooperate to form a hinge assembly because the centrally located coupling piece of a link portion is received in the interspace between the interspaced coupling pieces of a link portion of a successive module, and because a hinge pin extends through aligned receiving spaces of the cooperating coupling pieces. The modular conveyor chain further includes a plastic bearing element received between the centrally located coupling piece and the hinge pin. The hinge pin has a substantially constant cross section, and a central portion of the hinge pin is provided with a bearing element that has a closed cross section and extends along the hinge pin at the location of the central coupling element only. Opposing ends of the hinge pins are each provided with an end cap that includes a mantle portion that extends along the hinge pin at (Continued)

the location of an interspaced coupling piece only, and a radially inwardly extending flange portion that cooperates with an end face of the hinge pin.

20 Claims, 1 Drawing Sheet

(58) Field of Classification Search
USPC .................................................. 198/850, 853
See application file for complete search history.

(56) References Cited

U.S. PATENT DOCUMENTS

| | | | | |
|---|---|---|---|---|
| 4,024,605 | A * | 5/1977 | Henke | F16G 3/02 198/844.2 |
| 4,195,887 | A | 4/1980 | Ruddell | |
| 5,579,898 | A * | 12/1996 | Nakagawa | C04B 41/89 198/957 |
| 6,164,439 | A * | 12/2000 | Stebnicki | B65G 17/086 198/853 |
| 6,978,885 | B1 * | 12/2005 | Schumacher | B65G 17/30 198/851 |
| 7,097,032 | B2 * | 8/2006 | Hartman | F16G 13/06 198/853 |
| 2003/0085107 | A1 * | 5/2003 | Sedlacek | B65G 17/08 198/853 |
| 2018/0072502 | A1 | 3/2018 | Shibayama et al. | |

* cited by examiner

MODULAR CONVEYOR CHAIN

CROSS-REFERENCE TO RELATED APPLICATIONS

This application is a 371 application of PCT/NL2021/050382 filed on Jun. 18, 2021, which claims priority of Netherlands patent application 2025872 filed on Jun. 19, 2020, both of which are incorporated by reference herein in their entirety.

The invention relates to a modular conveyor chain, comprising link portions made of sheet metal.

Metal modular conveyor chains are generally known, and are for example used for conveying glass bottles.

Metal conveyor chain modules are so conventional that they have been standardized in DIN 8153/ISO 4348. The DIN 8153/ISO 4348 standardization determines the sizes and dimensions of so called flat-top chain modules, e.g. the pitch between chain modules, the hinge pin diameter and e.g. how the coupling pieces of the portions of the modules need to be curled. The standardization applies to chains with both single hinged and double hinged assembly. The hinge assembly consists of hinge eyes that loop around a hinge receiving space to retain a hinge pin.

The chains are manufactured by punching chain link blanks from sheet metal resulting in a base form for a link portion. The blanks consist of an elongate conveying body and tongues extending from longitudinal sides of the conveying body to form coupling pieces. The tongues are bent to loop around a receiving space for a hinge pin. One tongue is centrally located on one longitudinal side of the elongate conveying body and two spaced apart tongues are placed on the opposite longitudinal side. The two spaced apart tongues on one longitudinal side are arranged with an interspace such that when the tongues are bent to form coupling pieces, the centrally placed coupling piece is received in the interspace between the two spaced apart coupling pieces on a consecutive module. Consecutive metal conveyor chain modules are linked together by retaining metal hinge pins in hinge receiving spaces so that adjacent modules can rotate with respect to each other on an axis transverse to the conveyor chain. The modular conveyor chain can be assembled by axially driving a hinge pin into the hinge assembly formed by the cooperating coupling pieces of two consecutive modules.

During use the hinge pins and hinge eyes are subject to wear and tear at the area of rotation, which necessitates the replacement of pins and hinge eyes over time. It is customary to lubricate the chain to reduce hinge pin wear. However, lubrication is cumbersome. Maintaining the right amount of lubrication is not simple, and excess lubricant may easily cause slippery areas around the conveyor system, and pollution of the conveyor. In certain food processing industries lubrication is prohibited, which further accentuates the problem caused by wear.

In NL 2020301 a conveyor chain has been proposed that includes a bearing element in the form of a plastic sleeve to reduce the wear of the hinge pins and hinge eyes without lubrication, such that the conveyor chain may e.g. be used where lubrication is prohibited. The bearing element is carried on a hinge pin having a substantially constant cross section, and is received between the centrally located coupling piece and the hinge pin. In one embodiment, the plastic sleeve extends along the full length of the hinge pin and is provided at one end with a radially inwardly extending flange portion that cooperates with the end face of the hinge pin to facilitate insertion. The sleeve is fixated to the hinge pin to prevent axial migration using the two spaced apart coupling pieces. In another embodiment, the plastic sleeve extends along the hinge pin at the location of the central coupling element only, and tubular filler pieces may be provided under the two spaced apart coupling pieces to prevent axial migration. To facilitate insertion, the sleeve is provided with an open, C-shaped cross section.

In practice, the assembly of such chain with plastic sleeve has proven to be problematic and/or the wear resistance of the plastic sleeve has been low.

An object of the invention therefore is to provide a modular conveyor chain that mitigates the above mentioned drawbacks, in particular a steel modular conveyor chain that can be used without lubrication, that is wear resistant and that can be manufactured and assembled cost-effectively.

Thereto, the invention provides a modular conveyor chain, comprising a number of successive, mutually hingedly connected modules, which modules each comprise a link portion made of sheet metal that has a body part that forms a conveying surface, which body part is provided with a centrally located coupling piece on one side thereof, and a pair of interspaced coupling pieces on an opposite side thereof that include an interspace in between, which coupling pieces each extend from the body part to loop around a receiving space that is positioned lower than the body part, wherein coupling pieces of successive modules cooperate to form a hinge assembly because the centrally located coupling piece of a link portion is received in the interspace between the interspaced coupling pieces of a link portion of a successive module, and because a hinge pin extends through aligned receiving spaces of the cooperating coupling pieces, further including a bearing element received between the centrally located coupling piece and the hinge pin, wherein the hinge pin has a substantially constant cross section, wherein a central portion of the hinge pin is provided with a plastic sleeve as bearing element that has a closed cross section and that extends along the hinge pin at the location of the central coupling element only, and wherein opposing ends of the hinge pins are each provided with an end cap that includes a mantle portion that extends along the hinge pin at the location of an interspaced coupling piece only, and a radially inwardly extending flange portion that cooperates with an end face of the hinge pin.

By using a hinge pin with a substantially constant cross section, a cylindrical hinge pin can be used, which saves costs. In addition, due to its constant cross section, the hinge pin can be inserted axially into the bearing element smoothly, which facilitates assembly. A costly hinge pin with a reduced diameter section may thus be omitted.

By providing a central portion of the hinge pin with a plastic sleeve as bearing element that has a closed cross section and that extends along the hinge pin at the location of the central coupling element only, a low cost bearing element may be provided that is easy to assemble, yet wear resistant. In particular, the bearing element may rotate about to the hinge pin to form a bearing, and is free of a weakened circumferential area that is prone to wear.

By providing opposing ends of the hinge pins each with an end cap that includes a mantle portion that extends along the hinge pin at the location of an interspaced coupling piece only, and a radially inwardly extending flange portion that cooperates with an end face of the hinge pin, axial migration of the plastic sleeve may be prevented, while insertion is facilitated. In particular, during insertion of the hinge pin with its plastic sleeve into the hinge assembly, the leading end cap may be entrained by cooperation of its flange portion with the leading end face of the hinge pin, while the trailing end cap may be pushed in by pressing the flange portion onto the trailing end face of the hinge pin, all while keeping the plastic sleeve in its proper axial position. This arrangement allows the end caps to be made of plastics material, which reduces cost further.

The receiving space of the interspaced coupling pieces may, during use, retain the hinge pin and the end caps together tightly by clamping. The central coupling piece may then be non-clamping, e.g. with a loose fit, to allow rotation between consecutive hingedly connected modules of the modular conveyor chain around the hinge pin. The ends of the hinge pin may at the location of the spaced apart or interspaced coupling pieces, if desired, be provided with knurling at the mantle surface in a conventional way.

By providing the bearing element with an inner diameter that is oversized relative to the diameter of the hinge pin so that the hinge pin is received in the bearing element in a sliding fit, it may be facilitated that the hinge pin can rotate within the sleeve. In particular, it may be achieved that the hinge pin may be bearing mounted in the bearing element to form a sleeve bearing.

By providing the bearing element with a wall thickness that is constant along the circumference of its cross section, the bearing element may be manufactured especially cost effectively, and wear resistance may be high.

By forming the receiving space of the interspaced and centrally located coupling pieces each as a substantially round hinge eye, the link ends of the chain modules may be embodied in a conventional, standardized way.

The hinge pin may be chosen to have a diameter such that hinge pin and the bearing element and end caps respectively together have a diameter that corresponds to the diameter of a standard 6.35 mm diameter hinge pin. This way, a standard chain link may be used.

The plastic material of the bearing element may be chosen to be an engineering plastic with the desired properties of low-friction, wear resistance and stiffness for insertion. This way, the bearing element has good structural properties to allow axial insertion of the bearing element into the hinge assembly and/or axial insertion of the hinge pin into the bearing element, whilst reducing the wear of the hinge pins and hinge eyes.

It will be clear to the skilled person that the technical features of the present conveyor chain elucidated in the above paragraphs can be advantageously used in a conveyor chain not only each alone but also in any possible combination. The technical features described in the paragraphs can be isolated from the context, and the isolated technical features from the different paragraphs can be combined. Such combinations are herewith specifically disclosed in this description.

The invention will be further elucidated on the basis of a non limiting exemplary embodiment, which is represented in the drawings. In the drawings.

It is noted that the drawings are only schematic representations of a preferred embodiment of the invention. In the drawings, identical or corresponding parts are represented with the same reference numerals.

Figure 1:
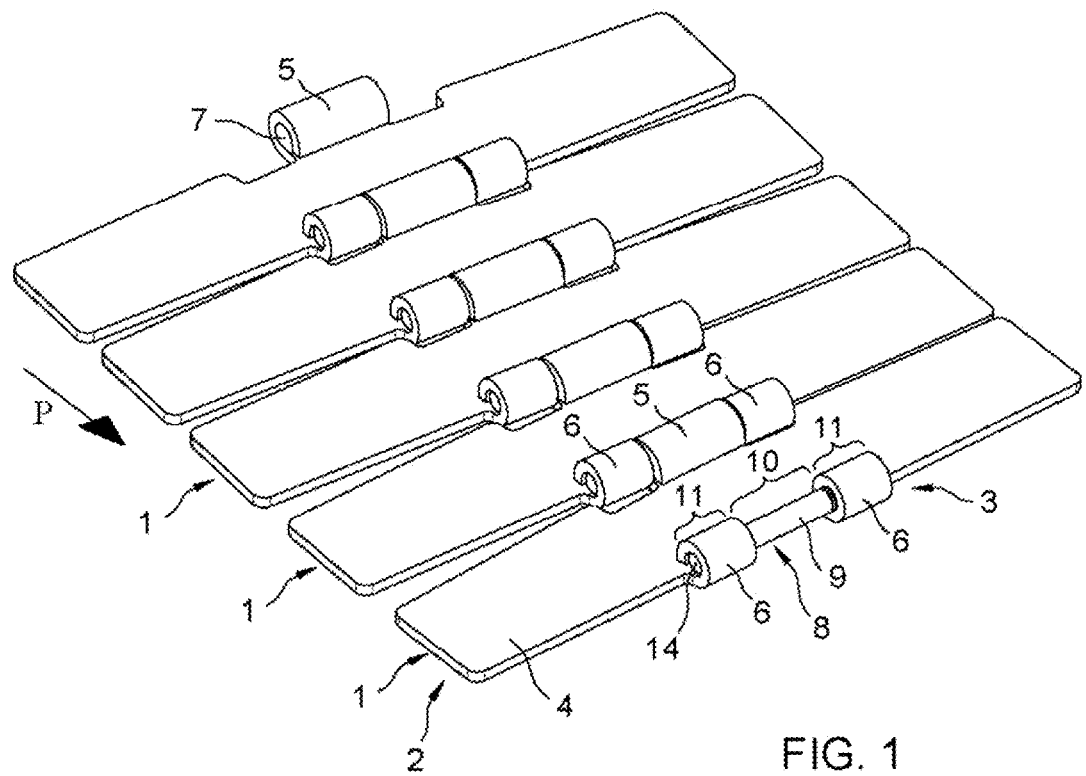
FIG. 1 shows a schematic perspective bottom view of a modular conveyor chain according to the invention.
Figure 2:
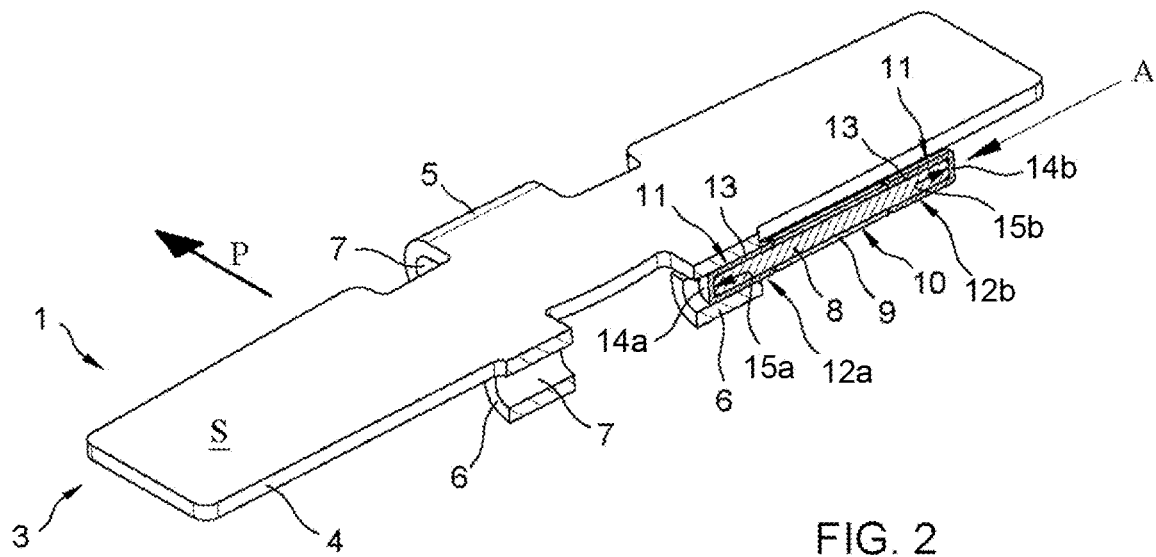
FIG. 2 shows a schematic cross sectioned perspective top view of a module for the conveyor chain of FIG. 1.
Figure 3:
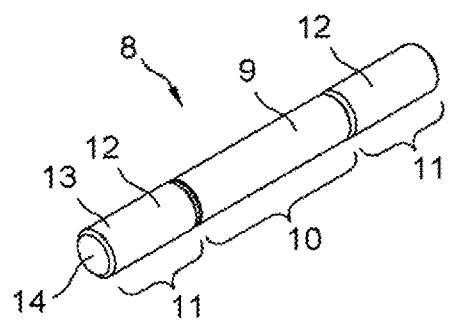
FIG. 3 shows a schematic perspective view of the hinge pin with bearing element and end caps of the chain of FIG. 1.

Referring to FIGS. 1-3 a module 1 for a modular conveyor chain 2 according to the invention is shown. The modular conveyor chain 2 comprises a number of mutually hingedly connected modules 1 successively arranged in the conveying direction.

The module 1 comprises a link portion 3 made of sheet metal that has a body part 4 that forms a conveying surface S. The body part 4 is provided with a centrally located coupling piece 5 on one longitudinal side thereof, and a pair of interspaced coupling pieces 6 on an opposite longitudinal side thereof that include an interspace in between. The coupling pieces 5, 6 extend from the body part 4 to loop around a receiving space 7 that is positioned lower than the body part 4. In use, coupling pieces 5, 6 of successive modules 1 cooperate to form a hinge assembly because the centrally located coupling piece 5 of a link portion 3 is received in the interspace between the interspaced coupling pieces 6 of a link portion 3 of a successive module 1, and because a hinge pin 8 extends transverse to a conveying direction through aligned receiving spaces 7 of the cooperating coupling pieces 5, 6. The coupling pieces 5,6 each form a substantially round hinge eye. The coupling pieces are in this embodiment thus embodied in a conventional, standardized way.

The hinge pin 8 has a substantially constant cross section, and a smooth cylindrical surface. The hinge pin 8 is made of steel, and is a conventional cylindrical hinge pin 8.

A central portion 10 of the hinge pin is provided with a plastic sleeve as bearing element 9. The plastic sleeve that forms the bearing element 9 is in this embodiment embodied as an extruded tube. The bearing element 9 is received between the centrally located coupling piece 5 and the hinge pin 8. The bearing element 9 has a closed cross section, and extends along the hinge pin at the location of the central coupling element 5 only.

The bearing element 9 is provided with a wall thickness that is constant along the circumference of its cross section. The bearing element 9 comprises an inner diameter that in unassembled condition is oversized relative to the diameter of the hinge pin 8 so that the hinge pin 8 is received in the bearing element 9 in a sliding fit. The hinge pin is thus bearing mounted in the bearing element 9, and the bearing element 9 forms a sleeve bearing.

Opposing ends 11 of the hinge pins are each provided with an end cap 12. Each end cap 12 is in this embodiment made of plastics material, and has been manufactured by injection moulding. Each end cap 12 includes a mantle portion 13 that axially extends along the hinge pin 8 at the location of an interspaced coupling piece 6 only, and a radially inwardly extending flange portion 14 that cooperates with an end face 15 of the hinge pin 8.

By providing opposing ends 11 of the hinge pin 8 each with an end cap 12 that includes a mantle portion 13 that axially extends along the hinge pin 8 at the location of an interspaced coupling piece 6 only, and a radially inwardly extending flange portion 14 that cooperates with an end face of the hinge pin 15, axial migration of the plastic sleeve that forms the bearing element 9 is prevented, while insertion into the hinge assembly is facilitated. The end caps 14 are mounted on the opposing ends 11 of the hinge pin 8 in an interference fit. During axial insertion of the hinge pin 8 with its plastic sleeve 9 and end caps 12 into the hinge assembly in the direction of arrow A, the leading end cap 12a is entrained by cooperation of its flange portion 14a with the leading end face 15a of the hinge pin 8, while the trailing end cap 12b is pushed in by pressing its flange portion 14b onto the trailing end face 15b of the hinge pin 8, all while keeping the plastic sleeve in its proper axial position. This arrangement allows the thin walled end caps 14 to be made of plastics material in spite of its relative flexibility, which reduces cost further.

The receiving spaces 7 of the interspaced coupling pieces 6 retain the opposing ends 10 of the hinge pin 10 and the end caps 12 carried thereon together tightly by clamping. The central coupling piece 7 is non-clamping, and has a loose fit to allow rotation between consecutive hingedly connected modules 1 of the modular conveyor chain 2 around the hinge pin 8.

The hinge pin 8 has been chosen to have a diameter such that hinge pin and the bearing element 9 and the end caps 12 together respectively have a diameter that corresponds to the diameter of a standard 6.35 mm diameter hinge pin. This way, a standard chain link is used.

The plastic material of the bearing element 9 and the end caps 12 has been chosen to be an engineering plastic with the desired properties, such as low-friction, wear resistance and stiffness to allow axial insertion into the hinge assembly.

As for the scope of this disclosure, it is pointed out that technical features which have been specifically described may be susceptible of a functional generalization. Furthermore, it is pointed out that—as far as not explicitly indicated—such technical features can be seen separately from the context of the given exemplary embodiment, and furthermore can be seen separately from the technical features with which they cooperate in the context of the example.

As for the scope of protection, it is pointed out that the invention is not limited to the exemplary embodiment represented here, and that many variants are possible. For example, the invention may also be applied to a chain having a double hinge assembly and/or a chain having a side flexing hinge assembly. Such variants will be clear to the skilled person and are understood to fall within the scope of the invention as set forth in the following claims.

LIST OF REFERENCE SIGNS 1 module
2 modular conveyor chain
3 link portion
4 body part
5 centrally located coupling piece
6 interspaced coupling piece
7 receiving space
8 hinge pin
9 bearing element
10 central portion
11 opposing ends
12 end cap
13 mantle portion
14 flange portion
15 end face
A arrow
P conveying direction
S conveying surface

The invention claimed is:

1. Modular conveyor chain, comprising a number of successive, mutually hingedly connected modules, which modules each comprise a link portion made of sheet metal that has a body part that forms a conveying surface, which body part is provided with a centrally located coupling piece on one side thereof, and a pair of interspaced coupling pieces on an opposite side thereof that include an interspace in between, which coupling pieces each extend from the body part to loop around a receiving space that is positioned lower than the body part, wherein coupling pieces of successive modules cooperate to form a hinge assembly because the centrally located coupling piece of a link portion is received in the interspace between the interspaced coupling pieces of a link portion of a successive module, and because a hinge pin extends through aligned receiving spaces of the cooperating coupling pieces, further including a bearing element received between the centrally located coupling piece and the hinge pin, wherein the hinge pin has a substantially constant cross section, wherein a central portion of the hinge pin is provided with a plastic sleeve as a bearing element that has a closed cross section and that extends along the hinge pin at the location of the central coupling element only, and wherein opposing ends of the hinge pins are each provided with an end cap that includes a mantle portion that extends along the hinge pin at the location of an interspaced coupling piece only, and a radially inwardly extending flange portion that cooperates with an end face of the hinge pin.

2. Modular conveyor chain according to claim 1, wherein the bearing element comprises an inner diameter that is oversized relative to a diameter of the hinge pin, so that the hinge pin is received in the bearing element in a sliding fit.

3. Modular conveyor chain according to claim 1, wherein the bearing element has a wall thickness that is constant along a circumference of its cross section.

4. Modular conveyor chain according to claim 1, wherein the receiving space of the interspaced and centrally located coupling pieces each form a substantially round hinge eye.

5. Modular conveyor chain according to claim 1, wherein the interspaced coupling pieces clamp the end caps onto the hinge pin.

6. Modular conveyor chain according to claim 1, wherein the end caps are made of plastics material.

7. Modular conveyor chain according to claim 1, wherein the hinge pin and the bearing element together have a diameter that corresponds to a diameter of a standard 6.35 mm diameter hinge pin.

8. Modular conveyor chain according to claim 2, wherein the bearing element has a wall thickness that is constant along a circumference of its cross section.

9. Modular conveyor chain according to claim 2, wherein the receiving space of the interspaced and centrally located coupling pieces each form a substantially round hinge eye.

10. Modular conveyor chain according to claim 3, wherein the receiving space of the interspaced and centrally located coupling pieces each form a substantially round hinge eye.

11. Modular conveyor chain according to claim 2, wherein the interspaced coupling pieces clamp the end caps onto the hinge pin.

12. Modular conveyor chain according to claim 3, wherein the interspaced coupling pieces clamp the end caps onto the hinge pin.

13. Modular conveyor chain according to claim 4, wherein the interspaced coupling pieces clamp the end caps onto the hinge pin.

14. Modular conveyor chain according to claim 2, wherein the end caps are made of plastics material.

15. Modular conveyor chain according to claim 3, wherein the end caps are made of plastics material.

16. Modular conveyor chain according to claim 5, wherein the end caps are made of plastics material.

17. Modular conveyor chain according to claim 2, wherein the hinge pin and the bearing element together have a diameter that corresponds to a diameter of a standard 6.35 mm diameter hinge pin.

18. Modular conveyor chain according to claim 3, wherein the hinge pin and the bearing element together have a diameter that corresponds to a diameter of a standard 6.35 mm diameter hinge pin.

19. Modular conveyor chain according to claim 4, wherein the hinge pin and the bearing element together have a diameter that corresponds to a diameter of a standard 6.35 mm diameter hinge pin.

20. Modular conveyor chain according to claim 5, wherein the hinge pin and the bearing element together have a diameter that corresponds to a diameter of a standard 6.35 mm diameter hinge pin.

* * * * *